Dec. 23, 1969 L. A. JACOBSON 3,486,007

RATE COUNTER

Filed Sept. 29, 1964 2 Sheets-Sheet 1

INVENTOR:
LYNN A. JACOBSON

BY, Richard F. Benway
ATTORNEY

RATE COUNTER

Filed Sept. 29, 1964 2 Sheets-Sheet 2

INVENTOR:
LYNN A. JACOBSON
BY,
Richard F. Bennay
ATTORNEY

United States Patent Office 3,486,007
Patented Dec. 23, 1969

3,486,007
RATE COUNTER

Lynn A. Jacobson, Boulder, Colo., assignor to Massachusetts Institute of Technology, Cambridge, Mass., a corporation of Massachusetts Filed Sept. 29, 1964, Ser. No. 400,123
Int. Cl. G06f *3/04*
U.S. Cl. 235—92 3 Claims

ABSTRACT OF THE DISCLOSURE

A gate controls the time interval that input data representing events are applied to a counter which therefore records rate. The counter develops incrementally signals representing the instantaneous count and applies them to the timing circuit controlling said gate. Large rates, shorten the interval said gate is open, thus producing a counter that represents a wide range of rates with constant accuracy.

This invention relates to counters and more specifically to a logarithmic counter for recording event rates having a large dynamic range providing a scale having uniform accuracy.

Conventional counters are employed to measure rates of known systems, that is, the number of events are recorded in the counter over a specified time interval. The numbr thus obtained reflects the average rate of the system during that interval. When the dynamic range is large (i.e. the system can have an arbitrarily low rate as readily as a rate ten or one hundred or even ten thousand times as large as the lowest rate) the capacity of the counter must be large enough to accommodate the largest possible rate. Yet, the counter must also record over a sufficiently long period of time to permit the recorder to specify the lowest possible rate within the required accuracy. A linear counter designed for such service would record low ranges satisfactorily utilizing only a fraction of the capacity of the counter and at the same time would record high rates with a surplus of significant figures. Ten percent accuracy for a rate of 100 would be ±1; while ten percent accuracy for 10,000 would be ±100. The last two digits when recording a rate in the 10,000 range are unnecessary. Furthermore, the time involved recording surplus digits is wasted.

The present invention overcomes the limitations of the linear counter when used to record events having a wide range of possible rates. This is accomplished by reducing the time that the counter is gated on for the higher rates.

With the present invention far fewer stages in the counter are required. In a linear binary system to measure over a dynamic range of 10,000 to within a ten percent overall accuracy, twenty flip-flops would be necessary. In the present invention only ten flip-flops are necessary to accomplish the same mission. It will also be seen that a linear counter, when used at some remote location as a satellite or unattended power station, will require several bits more than is needed with the present invention to relay the same information contained in their respective counters to a control station.

The time required to establish a low rate would be about the same for a linear counter as it would be for the present invention. However, the time required to establish high rates is substantially reduced in the present invention over that which is required in a linear counter; consequently, the average counting time is much lower in the present invention over that of the prior art.

An object of this invention is to provide a counter having a substantial uniform accuracy over a large dynamic range.

Another object of this invention is a reduced number of components with a consequent reduction in power consumption.

Another object of this invention is to reduce the time required to establish a high rate.

Other objects and features of this invention will become more apparent by reference to the following description when taken in conjunction with the accompanying drawings of which:

Figure 3A:
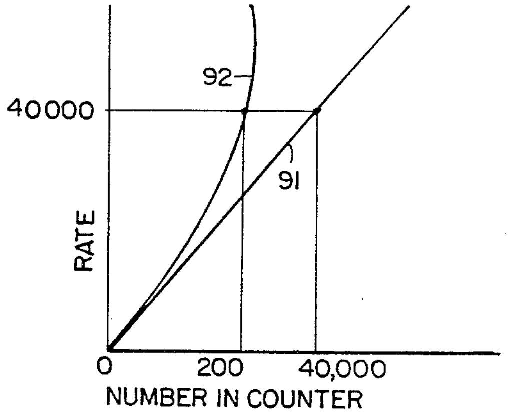
Figure 3B:
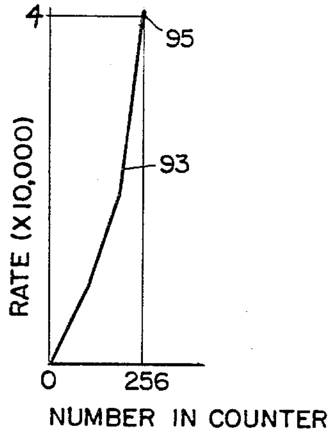

FIGURES 3*a* and 3*b* show the relationship of the actual rate and the number recorded in linear and compression counter.

Figure 1:
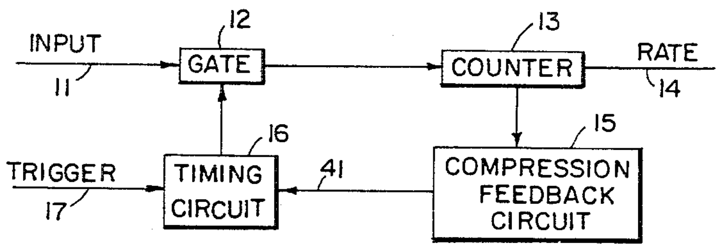
FIGURE 1 is a block diagram showing the elemental relationship of the components.

The basic relationship of the components necessary to determine rate are shown in FIGURE 1. Events are applied as input 11 to gate 12. When trigger 17 switches on timing circuit 16, input 11 passes through gate 12 to counter 13 where the events are recorded. Normally, timing circuit 16 is preset such that gate 12 remains open for a predetermined time interval. The rate can be related to the number appearing in the counter and the time interval such that:

$$R=N/T \tag{1}$$

where:

R=rate
N=number in counter
T=time gate 12 is open.

Counter 13 is shown connected to compression feedback circuit 15. Compression feedback circuit 15 causes a current 41 which is related to the instantaneous rate appearing in counter 13 to be applied to timing circuit 16. Current 41 reduces the period of time circuit 16 will hold gate 12 open. The rate then becomes some function of the number that appears in counter 13; that is:

$$R=f(n) \tag{2}$$

Timing circuit 16 contains a capacitor that is charged by current 41. The lower portion of the changing curve of a capacitor (i.e. voltage vs. time) is linear. The voltage at which gate 12 closes is selected well within this linear range. The number that appears in the counter when constant current 41 charges the capacitor of timing circuit 16 will be related to the rate by a constant. Curve 91 of FIGURE 3*a* illustrates this relationship. A number, say 40,000, in the counter corresponds to a rate of 40,000 events over the given time interval that gate 12 was open. For convenience, say the interval were one second, then the rate would be 40,000 per second.

When additional current is superimposed on the constant current above this linear relationship is altered. With an increase in current the voltage across the capacitor rises much more rapidly which causes the gate to close in a shorter time interval. Curve 92 represents the effect of increasing the current 41 applied to timing circuit 16 as a linear function of the instantaneous accumulated count. A new relationship where R is equal to N squared is developed. A number in the counter, say, 200 will correspond to a rate of 40,000 events over a reduced interval of time over that which the gate would have been open without additional current feedback.

The current feedback can be increased to an even greater extent over a much larger scale without detracting from the accuracy of the system. If the current 41 were increased such that it were related to the natural log of the instantaneous rate appearing in the counter, then a relationship illustrated by curve 95 of FIGURE 3*b* would be established. A number, say 256, would now correspond to a rate of 40,000 events over the given time interval with an overall accuracy comparable to that of the linear counter.

Figure 2:
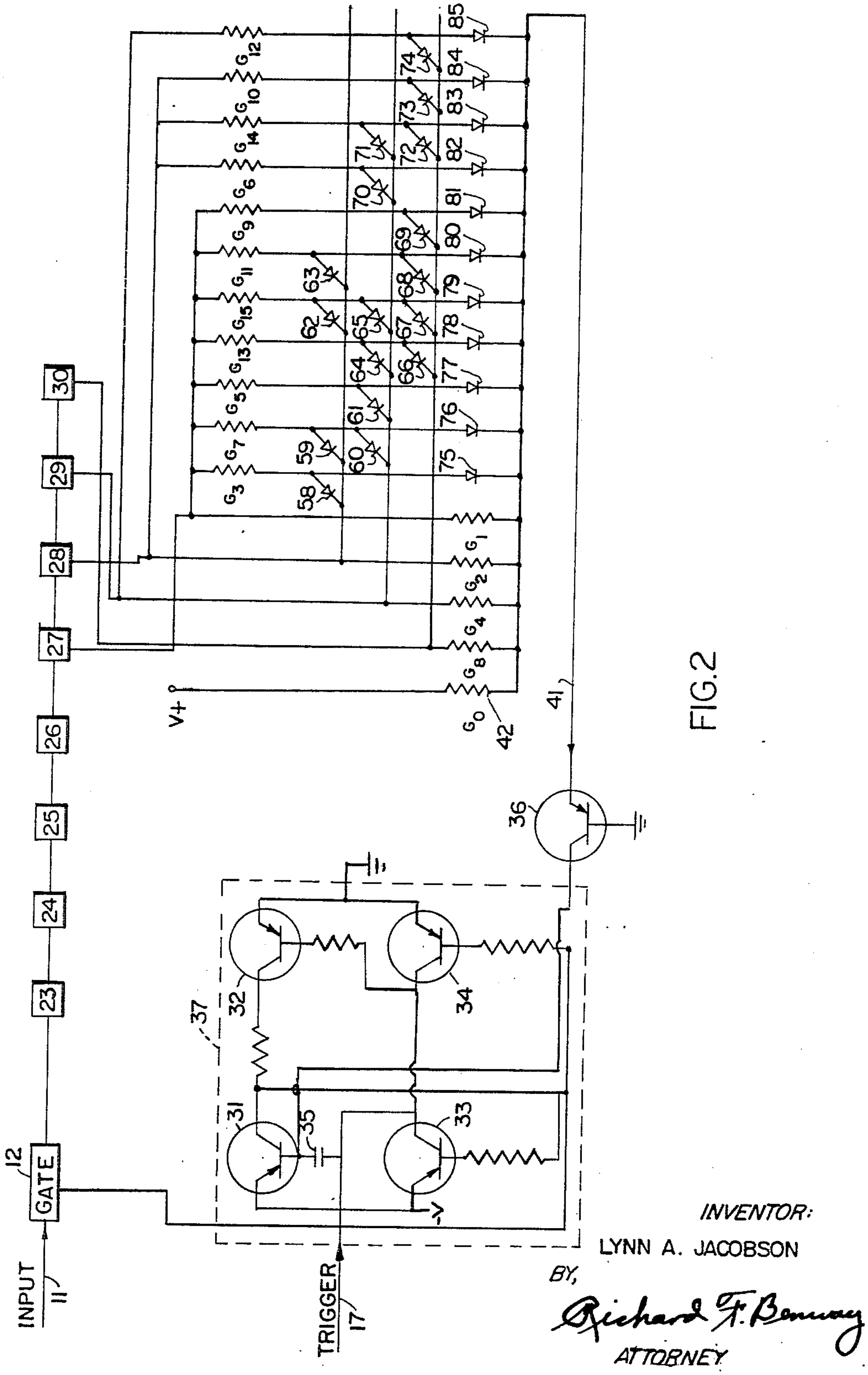
FIGURE 2 is a detailed embodiment of the invention.

Accuracy is difficult to define, for example, statistical accuracy of random occurring events is proportional to the square root of the number of events; furthermore, quantization errors are introduced, and the piece-wise linear approximation of the present invention introduces slight errors. Consequently, while eight flip-flops as shown in FIGURE 2 will, in most instances, provide a ten percent overall accuracy, ten flip-flops on a worst case basis will guarantee a ten percent overall accuracy. As a basis for comparison, with ten percent accuracy requirement, the expected improvement in necessary flip-flops for a given dynamic range is shown in the following table:

| | Number of flip-flops | |
|---|---|---|
| Dynamic range | Linear counter | Log counter |
| $10^2$ | 14 | 9 |
| $10^3$ | 17 | 10 |
| $10^4$ | 20 | 10 |
| $10^5$ | 24 | 11 |
| $10^6$ | 27 | 11 |
| $10^7$ | 30 | 11 |
| $10^8$ | 34 | 11 |

Timing circuit 16 in which T is the time it takes a current to charge a capacitor $V_0$ volts as a function of time is:

$$V_0=1/C\int_0^T i\,dt \qquad (3)$$

If $i$ is made a function of the instantaneous count $n$ in the register $$[\text{i.e. } i=g(n)] \qquad (4)$$

then:

$$V_0=\frac{1}{C}\int_0^T g(n)dt \qquad (5)$$

Substituting $t=n/R'$ where $t$=time, $n$=number, and $R$=rate and N corresponds to the final count at maximum time T.

$$R=\frac{1}{V_0C}\int_0^N g(n)dn \qquad (6)$$

By chosing different $g(n)$ functions, the various relationships discussed above between R and N can be formed. The simplest relationship is to make $g(n)$ equal to a constant having the value of the product of $K_0V_0$ and C. Thus:

$$R=\frac{1}{V_0C}\int_0^N K_0V_0C\,dn \qquad (7)$$

Therefore;

$$R=K_0N \qquad (8)$$

which represents the linear relationship of curve 91.

If $g(n)$ were made equal to the product of $2CV_0K_1n$ where $n$ is the instantaneous count appearing in the counter, then;

$$R=\frac{1}{V_0C}\int_0^N 2CV_0K_1n\,dn \qquad (9)$$

therefore;

$$R=K_1N^2 \qquad (10)$$

which represents the square relationship of curve 92. This form of compression is easily implemented in a binary counter through the use of a ladder network in compression feedback circuit 15.

Logarithmic compression is obtained by making $g(n)$ equal to the product of $V_0CK_2K_3$ and $e^{K_3n}$. We, therefore, obtain:

$$R=\frac{1}{V_0C}\int_0^N V_0CK_2K_3e^{K_3n}dn \qquad (11)$$

obtaining;

$$R=K_2(e^{K_3n}-1) \qquad (12)$$

or $$R+K_2=K_2e^{K_3n} \qquad (13)$$

which represents a logarithmic relationship between R and N, shown as curve 93 in FIGURE 3*b*. R is therefore, recorded at a constant accuracy (as opposed to full scale accuracy) with maximum rate compression.

Constants $K_2$ and $K_3$ for any system can be calculated when the minimum rate, the maximum rate, the resulting dynamic range, and the number of stages to be used have been established. For example: assuming a counter of eight stages, if a minimum of 100 events per second, and a maximum of 30,000 events per second, and a dynamic range of 400 is indicated ($100\times400=40{,}000$); then in the counter, a number $N=14$ corresponds to 100 events/sec. and a number $N=256$ corresponds to 40,000 events per second. Substituting these values into Equation 13 will provide two equations, one for minimum rate and one for maximum rate. Solving these equations simultaneously will provide values for $K_2$ and $K_3$.

Strictly speaking $g(n)$ cannot be logarithmic; but a piecewise linear approximation can be made. In practice, such an approximation does not detract materially from the overall accuracy of the system.

If the logarithmic relationship is approximately $p$ straight lines equally spaced in time $t$, then the $M^{th}$ segment becomes:

$$g(n)=K_2\int_{t=0}^{t/p}\left(\frac{te^{K_3(m-1)t/p}(e^{K_3t/p}-1)}{T/p}\right)+[e^{K_3(M-1)t/p}+1] \qquad (14)$$

Generalized Equation 14, will be shown utilized in the determination of the conductances of compression feedback 15.

Referring to FIGURE 2, logarithmic compression is shown implemented. The counter has eight stages: flip-flops 23, 24, 25, 26, 27, 28, 29 and 30. Timing circuit is a single shot multi-vibrator containing timing capacitor 35. Transistor 36 is added merely to prevent timing circuit 37 from loading down compression feedback circuit 15.

Compression feedback circuit 15 is made up of various conductances (resistors) and diodes. Tracing through the circuit, it is seen that the diodes direct the current through the matrix according to the states of the four flip-flops 27, 28, 29 and 30.

V91 and $G_0$42 establish the minimum current that will flow to charge capacitor 35. Once the values of $F_0$, C and $G_0$42 are established the relative value of the remaining conductances can be determined. Remembering that $g(n)$ was made equal to $V_0CK_2K_3e^{K_3n}$ to accomplish logarithmic compression as expressed by Equation 13. Then a general expression for $i$ would be:

$$i=V_0CK_2K_3e^{K_3n} \qquad (15)$$

but, $V_0C=T_{max}i$ (min.) and $T_{max}=140$ msec. and $K_2K_3=7$, therefore:

$$i=i_{min}e^{K_3n} \qquad (16)$$

When the largest number is in the counter the maximum current will be:

$$i_{max}=i_{min}e^{4.44} \qquad (17)$$

The ratio of $i_{max}$ to $i_{min}$ is:

$$\frac{i_{max}}{i_{min}}+e^{4.44} \qquad (18)$$

Having a binary counter this then can be related to a constant K raised to the 15th power, that is:

$$e^{4.44}=K^{15} \text{ or } K=e\frac{4.44}{15}=1.456 \qquad (19)$$

For each state of the counter K will be raised by the indicated power: that is, a value can be obtained for $K^2K^3$ . . . $K^{15}$. The corresponding conductances for the indicated currents can also be obtained such that the given value for each stage will be:

$$G_0=G_0 \quad (20)$$

$$G_1=G_0(K-1) \quad (21)$$

$$G_2=G_0(K^2-1) \quad (22)$$

$$G_3=G_0(K^3-K^2-K+1) \quad (23)$$

$$G_4=G_0(K^4-1) \quad (24)$$

$$G_5=G_0(K^5-K^4-K+1) \quad (25)$$

$$G_6=G_0(K^6-K^4-K^2+1) \quad (26)$$

$$G_7=G_0(K^7-K^6-K^5+K^4-K^3+K^2+K-1) \quad (27)$$

$$G_8=G_0(K^8-1) \quad (28)$$

$$G_9=G_0(K^9-K^8-K+1) \quad (29)$$

$$G_{10}=G_0(K^{10}-K^8-K^2+1) \quad (30)$$

$$G_{11}=G_0(K^{11}-K^{10}-K^9+K^8-K^3+K^2+K-1) \quad (31)$$

$$G_{12}=G_0(K^{12}-K^8-K^4+1) \quad (32)$$

$$G_{13}=G_0(K^{13}-K^{12}-K^9+K^8-K^5+K^4+K-1) \quad (33)$$

$$G_{14}=G_0(K^{14}-K^{12}-K^{10}+K^8-K^6+K^4+K^2-1) \quad (34)$$

$$G_{15}=G_0(K^{15}-K^{14}-K^{13}+K^{12}-K^{11}+K^{10}+K^9-K^8-K^7+K^6+K^5-K^4+K^3-K^2+1) \quad (35)$$

This circuit provides maximum compression for the given requirements to within three percent scale accuracy for the entire scale.

While I have described the principles of my invention in connection with specific apparatus, it is to be clearly understood that this description is only made by way of example and not as a limitation on the scope of our invention as set forth in the objects thereof and in the accompanying claims.

What is claimed is:

1. An event rate counter comprising,
gating means for controlling the flow of data,
counting means for recording the flow of data through said gating means,
compression feedback means for shaping signals in accordance with the instantaneous count appearing in said counting means,
timing means responsive to time shortening signals from said compression feedback means controlling the interval said gate is open, said time shortening signal is a function of the instantaneous count $g(n)$ in accordance with the equation $$R=\frac{1}{V_0C}\int_0^N g(n)dn$$

where R is the rate, and N represents the final count at maximum time T and $V_0$ is the charge on capacitor C, said timing means.

2. An event rate counter comprising,
gating means for controlling the flow of input data,
timing means for controlling the interval said gate remains open which includes a charging capacitor,
counting means having multiple stages for recording the input data
compression feedback means which includes a network of conductances and current directing diodes,
preselected stages of said counting means energizing preselected portions of said network of conductances, thereby generating a current in proportion to said instantaneous count appearing in said counter and applying said current to said charging capacitor of said timing means effectively compressing the rate stored in said counter.

3. An event rate counter comprising gating means for controlling the input of events, timing means for controlling the time interval said gate remains open, recording means for recording number of input events over a given interval, feedback means comprising a ladder network whereby the rate is related to the square of the instantaneous count appearing in said recording means, said timing means receiving time shortening signal from said feedback means in accordance with the equation $$R=\frac{1}{V_0C}\int_0^N 2CV_0k_1hdn$$

where R is the final rate, N the maximum count and $n$ the instantaneous count, $V_0$ equals the final change in capacitor C, said timing means.

References Cited

UNITED STATES PATENTS 3,062,442 11/1962 Boensel .............. 235—92

MAYNARD R. WILBUR, Primary Examiner

G. J. MAIER, Assistant Examiner

U.S. Cl. X.R.

328—140